(12) United States Patent
Willardson et al.

(10) Patent No.: US 11,900,227 B1
(45) Date of Patent: Feb. 13, 2024

(54) APPARATUS FOR PRODUCING A FINANCIAL TARGET STRATEGY AND A METHOD FOR ITS USE

(71) Applicant: Gravystack, Inc., Phoenix, AZ (US)

(72) Inventors: Chad Willardson, Phoenix, AZ (US); Scott Donnell, Phoenix, AZ (US); Travis Adams, Phoenix, AZ (US)

(73) Assignee: Gravystack, Inc.

( * ) Notice: Subject to any disclaimer, the term of this patent is extended or adjusted under 35 U.S.C. 154(b) by 0 days.

(21) Appl. No.: 17/872,466

(22) Filed: Jul. 25, 2022

(51) Int. Cl.
*G06N 20/00* (2019.01)
*G06F 18/214* (2023.01)

(52) U.S. Cl.
CPC ........... *G06N 20/00* (2019.01); *G06F 18/214* (2023.01)

(58) Field of Classification Search
CPC .......... G06N 20/00; G06N 3/08; G06N 5/047; G06N 5/04; G06Q 40/025; G06Q 40/00; G06Q 40/02; G06F 18/20; G06F 18/214
See application file for complete search history.

(56) References Cited

U.S. PATENT DOCUMENTS

| | | | | |
|---|---|---|---|---|
| 7,899,750 B1* | 3/2011 | Klieman | ................ | G06Q 40/02 705/40 |
| 8,650,108 B1* | 2/2014 | Schram | ................ | G06Q 40/00 705/37 |
| 10,521,856 B1 | 12/2019 | Joseph | | |
| 10,949,917 B1* | 3/2021 | Lovett | ................ | G06F 3/04842 |
| 11,094,016 B1* | 8/2021 | Welz | ................ | H04L 67/75 |
| 2006/0074788 A1* | 4/2006 | Grizack | ................ | G06Q 40/02 705/35 |
| 2007/0073617 A1 | 3/2007 | Tolbert | | |
| 2009/0106136 A1* | 4/2009 | Wright | ................ | G06Q 40/06 705/35 |
| 2009/0276368 A1* | 11/2009 | Martin | ................ | G06Q 40/02 705/36 R |
| 2010/0268629 A1* | 10/2010 | Ross | ................ | G06Q 10/10 705/35 |

(Continued)

OTHER PUBLICATIONS

Benedict George, "Learn-to-Earn, Move-to-Earn: How to Earn Crypto in New Ways", Jul. 7, 2022, Coindesk, pp. 1-7. (URL: https://www.coindesk.com/learn/learn-to-earn-move-to-earn-how-to-earn-crypto-in-new-ways/) (Year: 2022).*

(Continued)

*Primary Examiner* — Paulinho E Smith
(74) *Attorney, Agent, or Firm* — Caldwell Intellectual Property Law

(57) ABSTRACT

An apparatus for producing a target strategy comprising at least a processor and a memory communicatively connected to the at least a processor. The memory is configured to instruct the processor to receive a history datum. The memory also is configured to instruct the processor to identify a pattern datum using a quantitative field machine learning model. The quantitative field machine learning model is configured to train the quantitative field machine learning model using a quantitative field training data. The quantitative field machine learning model is also configured to identify the pattern datum as a function of the history datum. The memory then instructs the processor to generate a modified target as a function of the pattern datum. Finally, the memory instructs the processor to generate a target strategy as a function of the modified target.

16 Claims, 8 Drawing Sheets

(56) References Cited

U.S. PATENT DOCUMENTS

| | | | |
|---|---|---|---|
| 2012/0053987 A1 | 3/2012 | Satyavolu | |
| 2014/0067712 A1* | 3/2014 | Prasad .................. | G06Q 40/06 |
| | | | 705/36 R |
| 2015/0081498 A1* | 3/2015 | Caldwell ............... | G06Q 40/00 |
| | | | 705/35 |
| 2018/0101568 A1* | 4/2018 | Jones-McFadden ... | G06Q 40/02 |
| 2019/0147529 A1* | 5/2019 | Wright .................. | G06Q 40/06 |
| | | | 705/36 R |
| 2021/0073909 A1* | 3/2021 | Le Roux ................ | G06N 20/00 |
| 2022/0129988 A1* | 4/2022 | Faucher-Courchesne ................... | |
| | | | G06N 20/00 |

OTHER PUBLICATIONS

Cao et al., "AI in Finance: Challenges, Techniques, and Opportunities", Association of Computing Machinery, Feb. 2, 2022. pp. 1-38. (Year: 2022).*

Ramjattan et al., "Using Chatbot Technologies to Help Individuals Make Sound Personalized Financial Decisions", Dec. 2021, TT LAB, pp. 1-4 (Year: 2021).*

IP.com, "System and Method for Personal Financial Advising Based on Analysis of Purchase Behavior Under Emotional, Physical, and Cognitive User Context", Oct. 9, 2019, pp. 1-7. (Year: 2019).*

\* cited by examiner

APPARATUS FOR PRODUCING A FINANCIAL TARGET STRATEGY AND A METHOD FOR ITS USE

FIELD OF THE INVENTION

The present invention generally relates to the field of data identification. In particular, the present invention is directed to an apparatus for producing a target strategy and a method for its use.

BACKGROUND

Undesirable results may emanate from the misidentification from of the patterns on use of resources. Experts in the field have long need a way to identify pattern of use accurately and efficiently for the expenditure of resources.

SUMMARY OF THE DISCLOSURE

In an aspect, an apparatus for producing a target strategy is disclosed. The apparatus comprises at least a processor and a memory communicatively connected to the at least a processor. The memory is configured to instruct the processor to receive a history datum. The memory also is configured to instruct the processor to identify a pattern datum using a quantitative field machine learning model. The quantitative field machine learning model is configured to train the quantitative field machine learning model using a quantitative field training data, wherein the quantitative field training data contains a plurality of data entries containing a plurality of history data as inputs correlated to a plurality of pattern data as a output. The quantitative field machine learning model is also configured to identify the pattern datum as a function of the history datum. The memory then instructs the processor to generate a modified target as a function of the pattern datum. Finally, the memory instructs the processor to generate a target strategy as a function of the modified target In another aspect, a method for producing a target strategy is disclosed. The method comprises receiving, using a processor, a history datum. The method also comprises identifying, using a processor, a pattern datum using a quantitative field machine learning model. The method then trains, using a processor, the quantitative field machine learning model using a quantitative field training data, wherein the quantitative field training data contains a plurality of data entries containing a plurality of history data as inputs correlated to a plurality of pattern data as a output. A modified target is generated as a function of the pattern datum. A target strategy is generated as a function of the pattern datum These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for producing a target strategy is disclosed. The apparatus may comprise at least a processor and a memory communicatively connected to the at least a processor. The memory may be configured to instruct the processor to receive a history datum. The memory may also be configured to instruct the processor to identify a pattern datum using a quantitative field machine learning model. The quantitative field machine learning model may be configured to train the quantitative field machine learning model using a quantitative field training data, wherein the quantitative field training data contains a plurality of data entries containing a plurality of history data as inputs correlated to a plurality of pattern data as a output. The quantitative field machine learning model may also be configured to identify the pattern datum as a function of the history datum. The memory may then instruct the processor to generate a modified target as a function of the pattern datum. Finally, the memory may instruct the processor to generate a target strategy as a function of the modified target. Exemplary embodiments illustrating aspects of the present disclosure are described below in the context of several specific examples.

Figure 1:
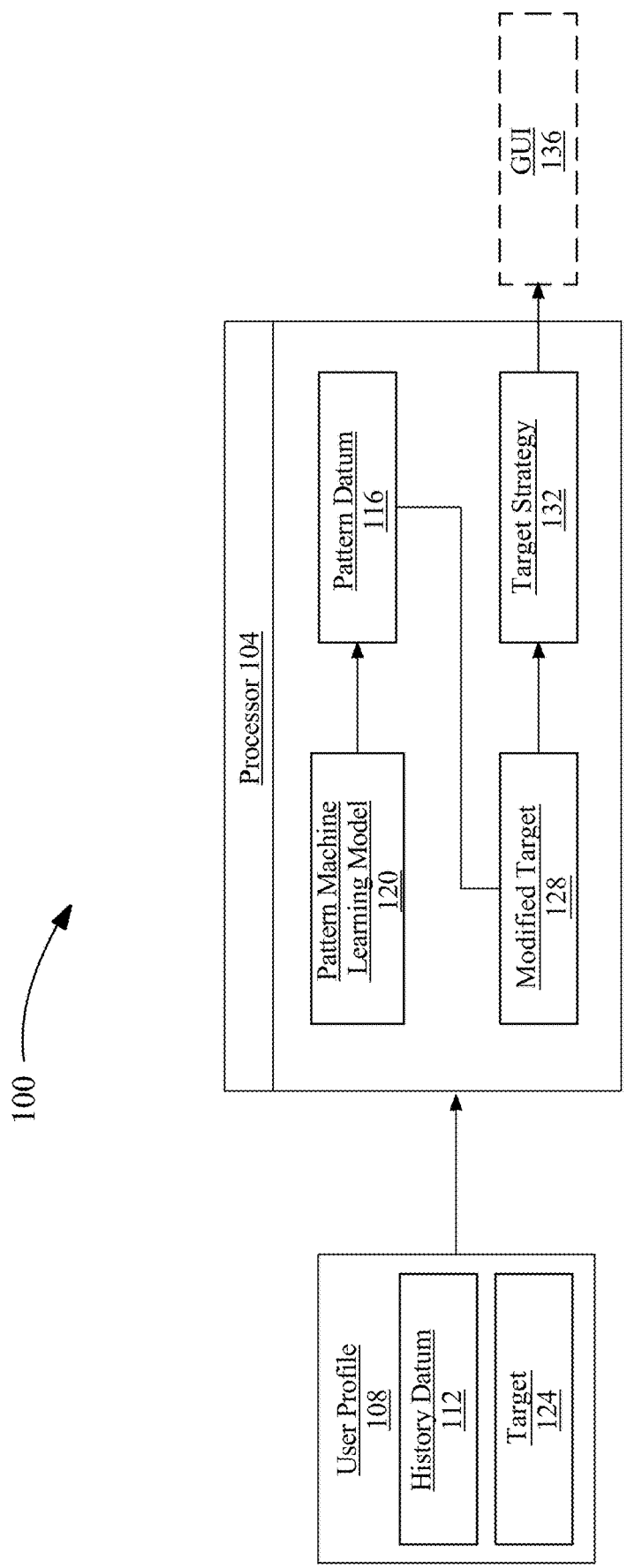
FIG. 1 is a block diagram of an exemplary embodiment of an apparatus for producing a target strategy.

Referring now to FIG. 1, an exemplary embodiment of a Apparatus 100 for an apparatus for pattern identification is illustrated. Apparatus 100 includes a Processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting Processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

With continued reference to FIG. 1, Processor 104 may be designed and/or configured to perform any method, method step, or sequence of method steps in any embodiment described in this disclosure, in any order and with any degree of repetition. For instance, Processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1. a processor 104 may be configured to receive a user profile 108. As used in the current disclosure, a "user profile" is a virtual representation of a user containing user information. "User information," as used in this disclosure, is information pertaining to the user. In some non-limiting embodiments, user profile 108 may include a digital avatar, a plurality of user information, digital summary of a user, user finances, history datum 112, target 124, other user assets, and the like thereof. In another non-limiting embodiment, user profile 108 may include a profile image, username, a set of user targets, and the like thereof. A "user," as used in this disclosure, is an entity that interacts with processor.

Still referring to FIG. 1, a user profile 108 may include a history datum 112. As used in the current disclosure, "history datum" is an element of data included within a user profile 108 containing historical expenditures of resources by a user. A "historical expenditure" as used in this disclosure is an expenditure of resources prior to the current history datum. An "expenditure" as used in this disclosure is the use of time, materials, or finances. An example of history datum 112 may include ledgers and/or records of expenditures of resources. This may include time cards, inventory records, financial records, time records, records of use of materials, bank statements, invoices, and the like. History datum 112 may be generated as a function of a user input or survey datum.

With continued reference to FIG. 1, in some embodiments, apparatus 100 may generate a user profile 108 or history datum 112 from survey data. As used in the current disclosure, "survey data" is an element of data that is generated from a series of answers to questions by the user. The survey data may include responses to a user survey given to a user. The survey may include questions regarding the user's financial history, time usage, expenditure of resources, invoices, and the like. The survey data may be used at various points by apparatus 100. For example, the survey data may be a component of history datum 112 or user profile 108. In some embodiments, survey data may be used to generate history datum 112 or determine a target or modified target.

Still referring to FIG. 1, a processor 104 may be configured to identify a pattern datum 116 as a function of history datum 112. As used in the current disclosure, a "pattern datum" is a is a sample of an expenditure of resources over a period of time that is repeatable or identifiable. As used in the current disclosure, "expenditure of resources" is the use of time, money, or materials by the user. In a non-limiting example, a expenditure of resources may include how much time a user spends on a given task. A expenditure of resources may also include how much time it takes a user to progress towards a target. In another non-limiting example, a expenditure of resources may include how a user manages his/her finances. Management of finances may include how much money a user spends or saves on a daily, monthly, or yearly. For example, pattern datum 116 may be that during the $4^{th}$ quarter of every year the user has a deficit of resources due to the Christmas holidays. In another non-limiting example, a pattern datum 116 may include identifying that the user spends an exorbitant amount of time on a given task during the $2^{nd}$ week of every month. A pattern datum 116 may be taken over a pre-determined time increment. This may include bi-weekly, monthly, quarterly, semi-annually, annually, 2 year, 5, year, 10 year periods, and the like. Pattern datum 116 may be described in terms of the ebb and flow of resources. In an embodiment, a pattern datum 116 may be display as a chart, graph, time line, and the like. Pattern datum 116 may include an indication that a user has a surplus of resources or deficit of resources during a period of time. Patten data 116 may also include an analysis of why a user has the surplus or deficit of resources. Patten data 116 may include an evaluation of where and why the user is allocating their resources. There may also be an evaluation of the necessity of those allocations or resources. This may be produced as in the form of a necessity rating. A non-limiting example, pattern datum 116 may identify a deficit of resources during the first quarter of every year. An evaluation of what caused this deficit may be a seasonal dip in production in the fourth quarter of the previous year. In another non-limiting example, pattern datum 116 may identify unnecessary expenditures of time and materials to help ease the burden of a deficit of resources.

With continued reference to FIG. 1, processor 104 may generate pattern datum 116 using an quantitative field machine learning model 120. As used in the current disclosure, a "quantitative field machine learning model" is a mathematical and/or algorithmic representation of a relationship between inputs and outputs. Quantitative field machine learning model may be similar to the machine learning model mentioned herein below in FIG. 2. In embodiments, an quantitative field machine learning model 120 may include a classifier, which may be consistent with the classifier disclosed with reference to FIG. 2. Inputs to the to the quantitative field machine learning model 120 may include user profile 108, history datum 112, past pattern datum 116, survey datum, past necessity rating, and the like. The output of the quantitative field machine learning model 120 may include a necessity rating and pattern datum 116. Quantitative field machine learning model 120 may by trained using quantitative field training data. Quantitative field training data is a plurality of data entries containing a plurality of inputs that are correlated to a plurality of outputs for training a processor 104 by a machine-learning process. Quantitative field training data may include user profile 108, history datum 112, past pattern datum 116, survey datum, past necessity rating, and the like. Quantitative field training data may include past necessity rating and past pattern data 116. "Past," refers to the fact that the data was collected prior to the current pattern datum 116. Quantitative field training data may be stored in a database, such as a training data database, or remote data storage device, or a user input or device.

Still referring to FIG. 1, a necessity rating may be incorporated within a pattern data 116. As used in the current disclosure, a "necessity rating" is a rating of the need for the expenditure of resources. A necessity rating may be calculated on a scale from 1-10, wherein a rating of 1 may be a unnecessary expenditure whereas a rating of 10 may be a necessary expenditure. A necessity rating may consider the need at the current time and the resource cost to fill that need. A necessity rating may rate each individual expenditure of resources. This may be generated from history datum 112 such as invoices, financial records, inventory records, time keeping records, and the like. In some embodiments, generating the necessity ranking may include linear regression techniques. Processor 104 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm mounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Still referring to FIG. 1, processor may be configured to generate a machine learning model, such as quantitative field machine learning model 120, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor may be configured to generate a machine learning model, such as quantitative field machine learning model 120, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, processor 104 may generate a target 124 as a function of the pattern datum 116. As used in the current disclosure, a "target" is a task or an accomplishment that the user would like to achieve. In embodiments, a target 124 may be an pecuniary target, improving pecuniary literacy, a vocational target, an educational target, a skill target, a health target, fitness target, and the like. As used in the current disclosure, a "vocational target" is a target 124 that is related to improving a user's career or career skills. As used in the current disclosure, an "pecuniary target" is a target 124 that is related to improving a user's pecuniary position. As used in the current disclosure, an "pecuniary literacy" is a user's knowledge of how to improve his or her pecuniary position. As used in the current disclosure, an "educational target" is an element of data used to improve the users formal or professional education. Examples of targets 124 may include saving money, improving pecuniary literacy, buying a home, establishing an emergency fund, optimizing the family budget, starting a new career field, improving overall health, fitness targets, and the like.

With continued reference to FIG. 1, processor 104 may generate a modified target 128 as a function of the pattern datum 116. As used in the current disclosure, a "modified target" is a target 124 that has been adapted to accommodate a user behavior. As used in the current disclosure, a "user behavior" is the expenditure of resources by the user. A user behavior may include a user's pattern datum 116. A modified target 128 may be adapted so that it is more efficient or easier for a user to obtain target 124. In an embodiment, a modified target 128 may be adapted to correct negative or undesirable aspects of a user's pattern datum 116. In a non-limiting example, a modified target 128 may include improving the efficiency of a user's expenditure of resources. The pattern datum 116 may provide an indication of how the user expends their resources. A modified target 128 may provide a target that is tailored to the users expenditures of resources as designated by the pattern datum 116. A modified target may be generated as a function of a target 124 and a pattern datum 116. A modified target 128 may be generated using a target machine learning model of a fuzzy inference.

With continued reference to FIG. 1, processor 104 may generate a pattern correction datum as a function of the pattern datum 116. As used in the current disclosure, "pattern correction datum" is a set of instructions configured to augment a pattern datum in a manner to produce a favorable results to the user. Augmenting a pattern datum may include manipulating or correcting the pattern data to produce a desired change. Instructions may include a step by step process configured to augment a pattern datum. This may include remedial steps such as education of the user regarding pattern datum. This may also include steps to improve the efficiency of the user while creating the pattern datum. A determination of favorable results for the user may be generated via survey data or user profile. A pattern correction data may encompass an evaluation of pattern datum 116 and necessity rank. In an embodiment, pattern correction data may include a plurality of tasks that will augment pattern data in a favorable manner. This may also include one or more remedial tasks such as educating the user regarding the cause of the undesirable patterns. Pattern correction datum may be generated as a function of a necessity rating. In a non-limiting example, a pattern correction datum may suggest the user eliminate or reduce all expenditures of resources with a necessity rating over 7 on a scale from 1 to 10. A pattern correction datum may additionally suggest areas where a user can downsize their expenditure of resource or improve efficiency. This may include time saving suggestions, material saving suggestions, and the like. A non-limiting example of pattern correction datum may include instructions about how to reduce a undesired expenditure or resources such as time, money, or materials. A pattern correction datum may also include a suggestion of areas that may need additional resources to improve the overall efficiency of the user. Pattern correction datum may be configured keep an expenditure of resources within a given range. This range may be determined as a function of the modified target 128 or user preference.

With continued reference to FIG. 1, processor 104 may generate modified target 128 using a target machine learning model. As used in the current disclosure, a "target machine learning model" is a mathematical and/or algorithmic representation of a relationship between inputs and outputs. Target machine learning model may be similar to the machine learning model mentioned herein below in FIG. 2. In embodiments, a target machine learning model may include a classifier, which may be consistent with the classifier disclosed with reference to FIG. 2. Inputs to the to the machine learning model may include user profile 108, history datum 112, pattern datum 116, survey datum, past pattern correction datum, necessity rating, past modified targets, and the like. The output of the machine learning model is a modified target 128 and pattern correction datum. Target machine learning model may by trained using target training data. Target training data is a plurality of data entries containing a plurality of inputs that are correlated to a plurality of outputs for training a processor 104 by a machine-learning process. Target training data may include user profile 108, history datum 112, pattern datum 116, survey datum, necessity rating, past modified targets, and the like. Target training data may include past necessity rating and past modified target 128. "Past," refers to the fact that the data was collected prior to the current modified target 128. Target training data may be stored in a database, such as a training data database, or remote data storage device, or a user input or device.

With continued reference to FIG. 1, processor 104 may be configured to generate a target strategy 132 for the user. As used in the current disclosure, a "target strategy" is a series of steps to achieve a target. Target strategy 132 may include a plurality of instructions regarding how to achieve a modified target 128 or pattern datum 116. A pattern correction datum may also be used to generate a modified target 128. For example, a pattern correction datum may instruct the user on how to improve his/her pattern datum and a target strategy 132 may be generated as a function of the improved pattern datum. In another non-limiting example, a target strategy 132 may be generated as a function of the pattern datums 116 may identification a user's expenditure of resources. In an embodiment, a target strategy 132 may be generated as a function of the selection of the modified target 128. A target strategy 132 may be a target 124 or a modified target 128 broken down into a series of sub-targets. In some embodiments, the sub-targets may be smaller or simpler targets used to progress the user towards modified target 128. For example, if the processor 104 generates a pecuniary modified target 128 of purchasing a home. A non-limiting example of a target strategy 132 for buying a home may be: 1. conducting an evaluation of the user's credit; 2. identifying a price range; 3. promoting the users to save enough money for a down payment; 4. identify a home for sale within the price range; 5. get a mortgage on the home; 6. close on the home. Additionally, a target strategy 132 may be composed of a plurality of steps and sub steps. A step may comprise a task that a user must complete in to achieve a modified target 128. Once a user has achieved a plurality of steps and subs steps the user may achieve a waypoint. In embodiments, a target strategy 132 may be comprised of a set of waypoints. As used in the current disclosure, a "waypoint" is a milestone for accomplishing the target 124. A non-limiting example of a waypoint may be saving 20% of the total cost of a home for a down payment, in reference to the above example. As used in the current disclosure, a "milestone" is an event marking a significant change or progress for the user achieving his or her target 124.

With continued reference to FIG. 1, processor 104 may be configured to generate a decentralized fiat as a function of completion of a modified target 128. As used in the current disclosure, a "decentralized fiat" is an institution-free method of transferring wealth or ownership of any other commodity without needing a third party. A institution may include but is not limited to a governmental entity, banks, credit unions, centralized banks, and the like. Decentralized fiat may include a non-fungible token or various crypto currencies. A "non-fungible token," as used in this disclosure, is a unique and non-interchangeable unit of data stored on a digital ledger and/or immutable sequential listing. "Cryptocurrency," as used in this disclosure, is a digital or virtual currency that is secured by cryptography. This makes it nearly impossible to counterfeit or double-spend. In some embodiments, cryptocurrencies are decentralized networks based on blockchain technology such as immutable sequential listing enforced by a network of computing devices. In some embodiments, apparatus 100 may allow various types of cryptocurrency such as Ethereum (ETH), Litecoin (LTC), Cardano (ADA), Polkadot (DOT), Bitcoin Cash (BCH), Stellar (XLM), and the like thereof. Persons skilled in the art, upon reviewing the entirety of this disclosure, will be aware of the various embodiments of different types of money for purposes as described herein. Decentralized fiat may be associated with reproducible digital files such as photos, videos, and audio. Decentralized fiat may also be associated with physical assets such as real estate, collectables, and other commodities. In an embodiment, processor 104 may issue a certificate of completion after a user has achieved a waypoint. Decentralized fiat may be used to represent a certificate of completion. Possession or payment of decentralized fiat may serve as proof that the user has accomplished all or a portion of a target 124, modified target 128, or waypoint. Possession or payment of decentralized fiat may also serve as proof that the user has achieved a target 124, modified target 128, or waypoint. A decentralized fiat may also be awarded as a function of the pattern correcting datum. Decentralized fiat may be awarded to the user as the pattern datum improves because of the pattern correction datum. In embodiments, the time and level of difficulty for the user to achieve a target 124, modified target 128, or waypoint may be demonstrated by the value of decentralized fiat. The creator may "tokenize" such assets to be stored on a digital ledger and/or immutable sequential listing, which may ensure non-duplicability and ownership, generate income, and/or enable accessibility of the assets. Persons skilled in the art, upon reviewing the entirety of this disclosure, will be aware of the various embodiments and purposes of tokenizing an asset.

With continued reference to FIG. 1, target 124, modified target 128, waypoint, pattern datum, may be displayed using a graphical user interface (GUI) 136. As used in the current disclosure, a "graphical user interface" may include a plurality of lines, images, symbols. GUI 136 may include a plurality of lines, images, symbols. GUI 136 may be displayed on a display device. Display device may include, but is not limited to, a smartphone, tablet, laptop, monitor, tablet, and the like. Display device may include a separate device that includes a transparent screen configured to display computer generated images and/or information. The user may view the information displayed on the display device in real time.

Figure 2:
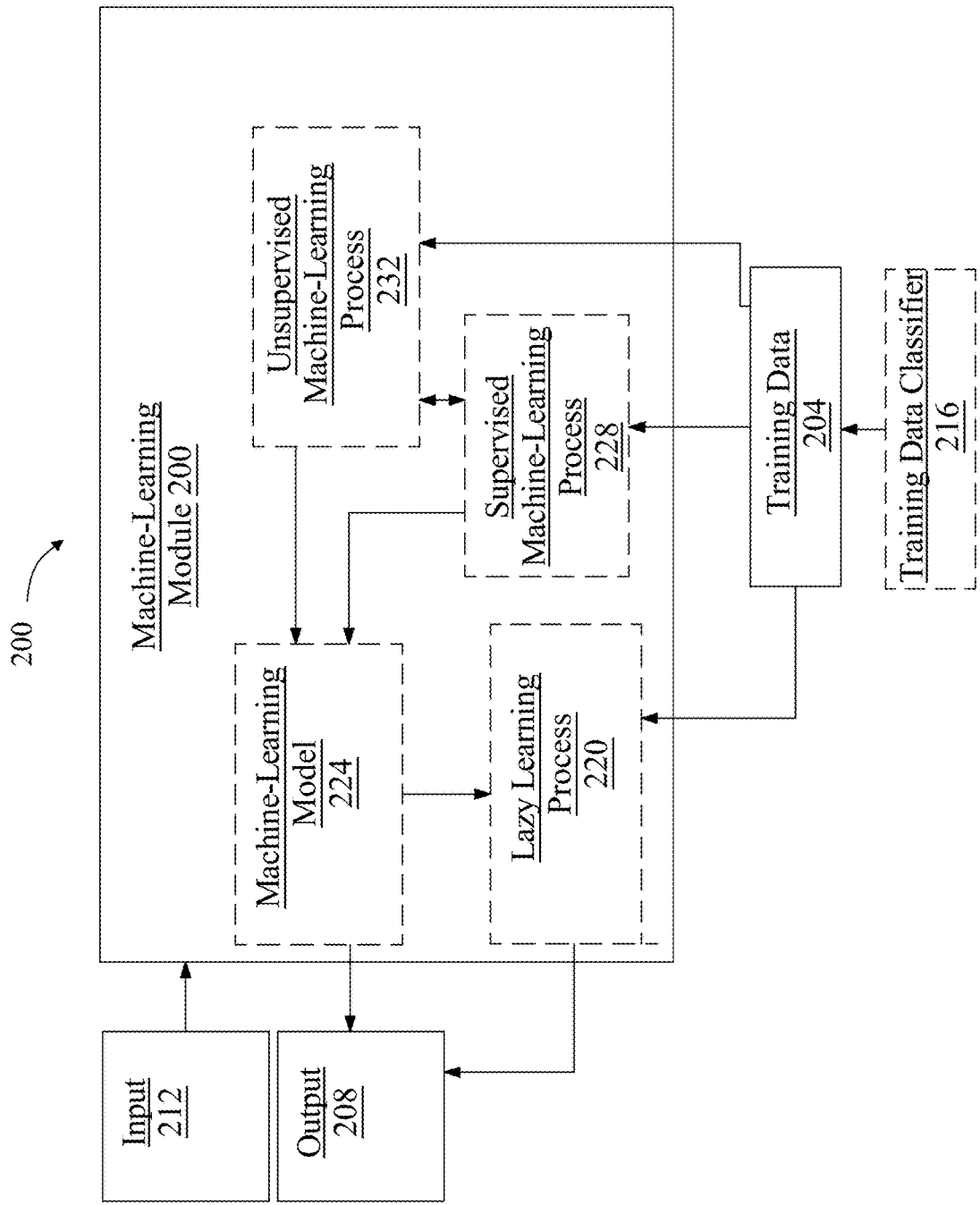
FIG. 2 is a block diagram of an exemplary machine-learning process.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include a modified target 128 or pattern datum 116 as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

For example, and still referring to FIG. 2, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Figure 3:
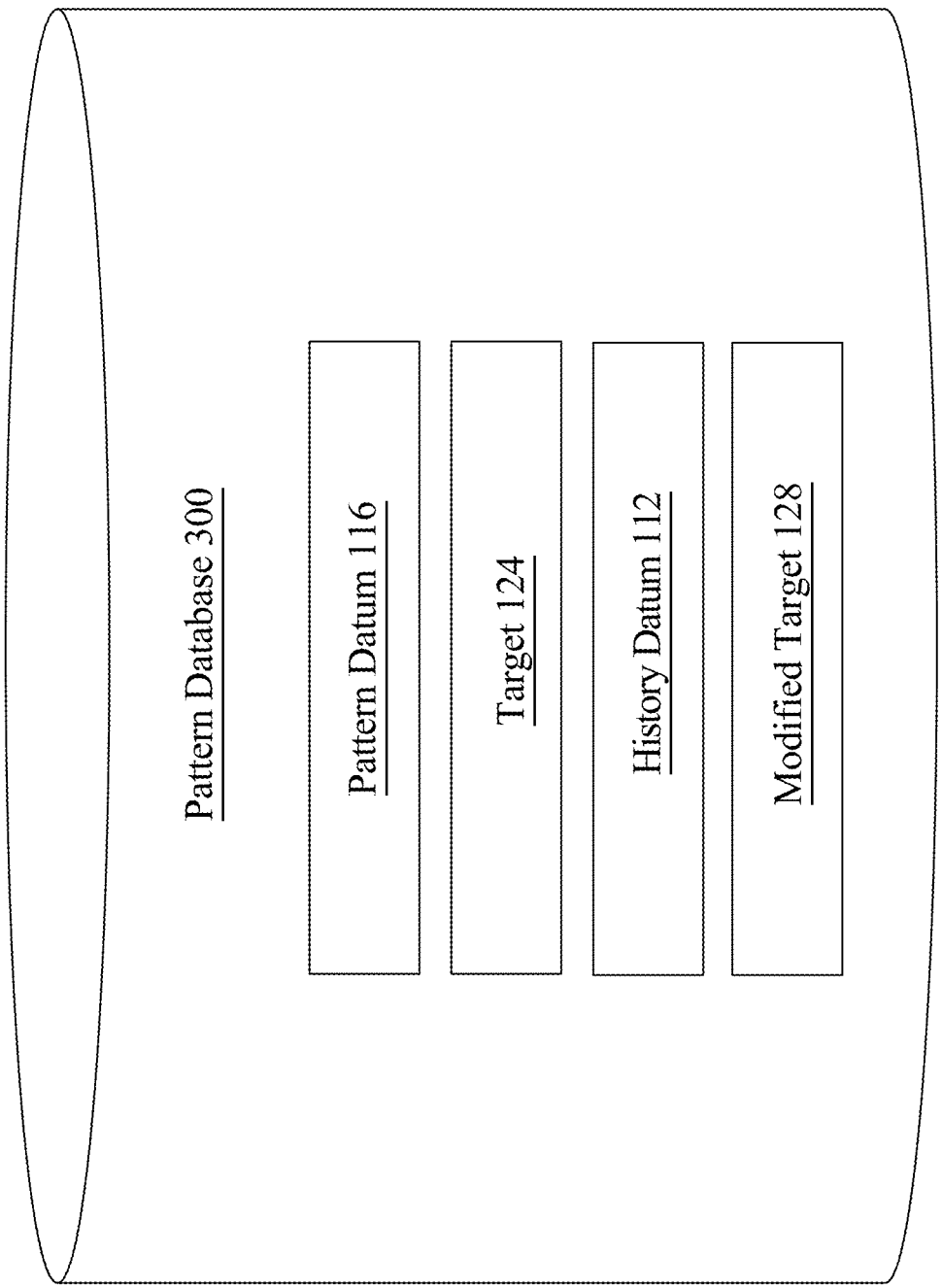
FIG. 3 is a block diagram of an exemplary embodiment of a pattern database.

Now referring to FIG. 3, an exemplary pattern database 300 is illustrated by way of block diagram. User profile 108, history datum 112, pattern datum 116, survey datum, necessity rating, past modified targets may be stored in a pattern database 300 (also referred to as "database"). Processor 104 may be communicatively connected with pattern database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. Pattern database 300 may be implemented, without limitation, as a relational database, a key-value retrieval database such as a NOSQL database, or any other format or structure for use as a database that a person skilled in the art would recognize as suitable upon review of the entirety of this disclosure. Pattern database 300 may alternatively or additionally be implemented using a distributed data storage protocol and/or data structure, such as a distributed hash table or the like. Pattern database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
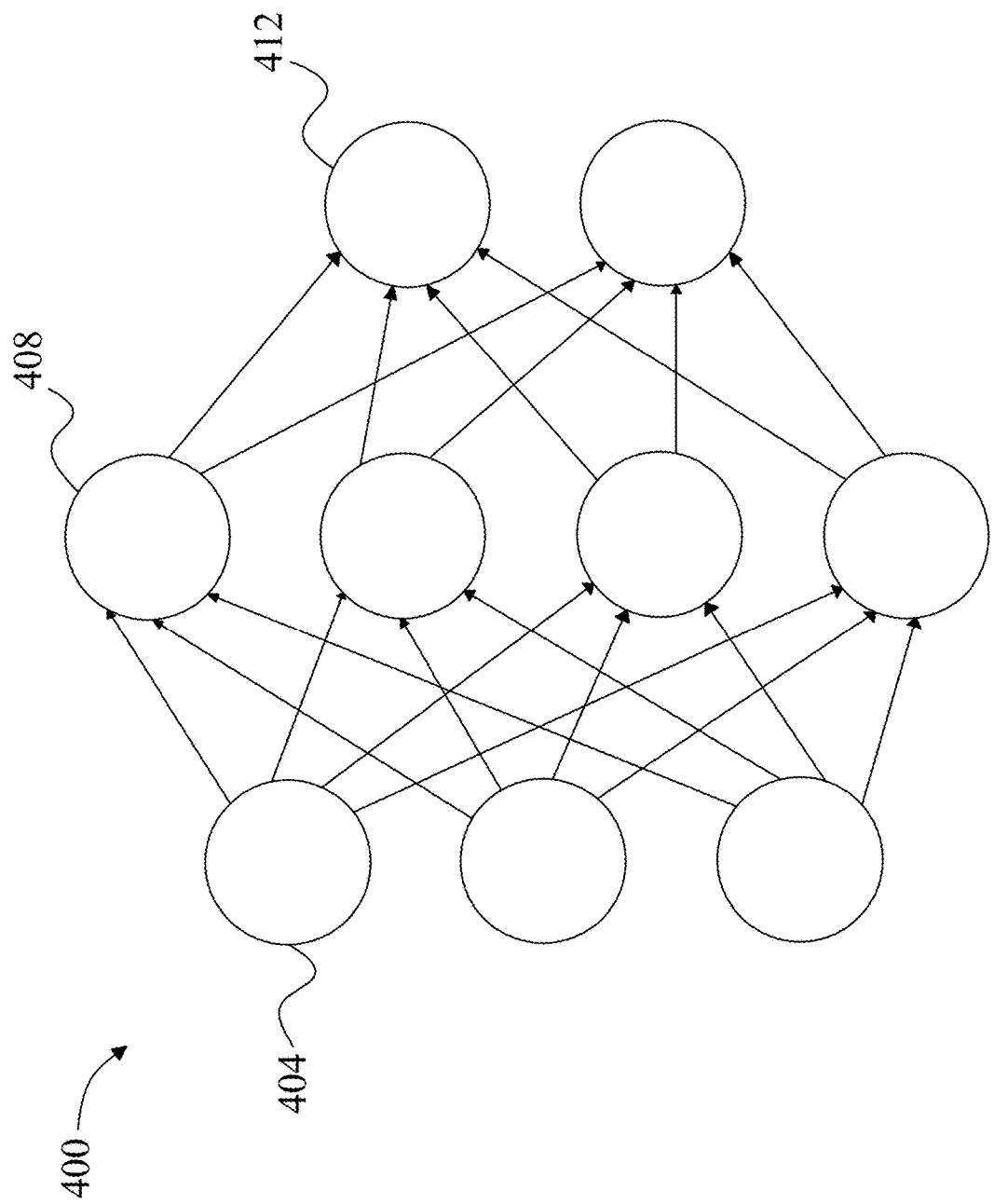
FIG. 4 is a diagram of an exemplary embodiment of neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
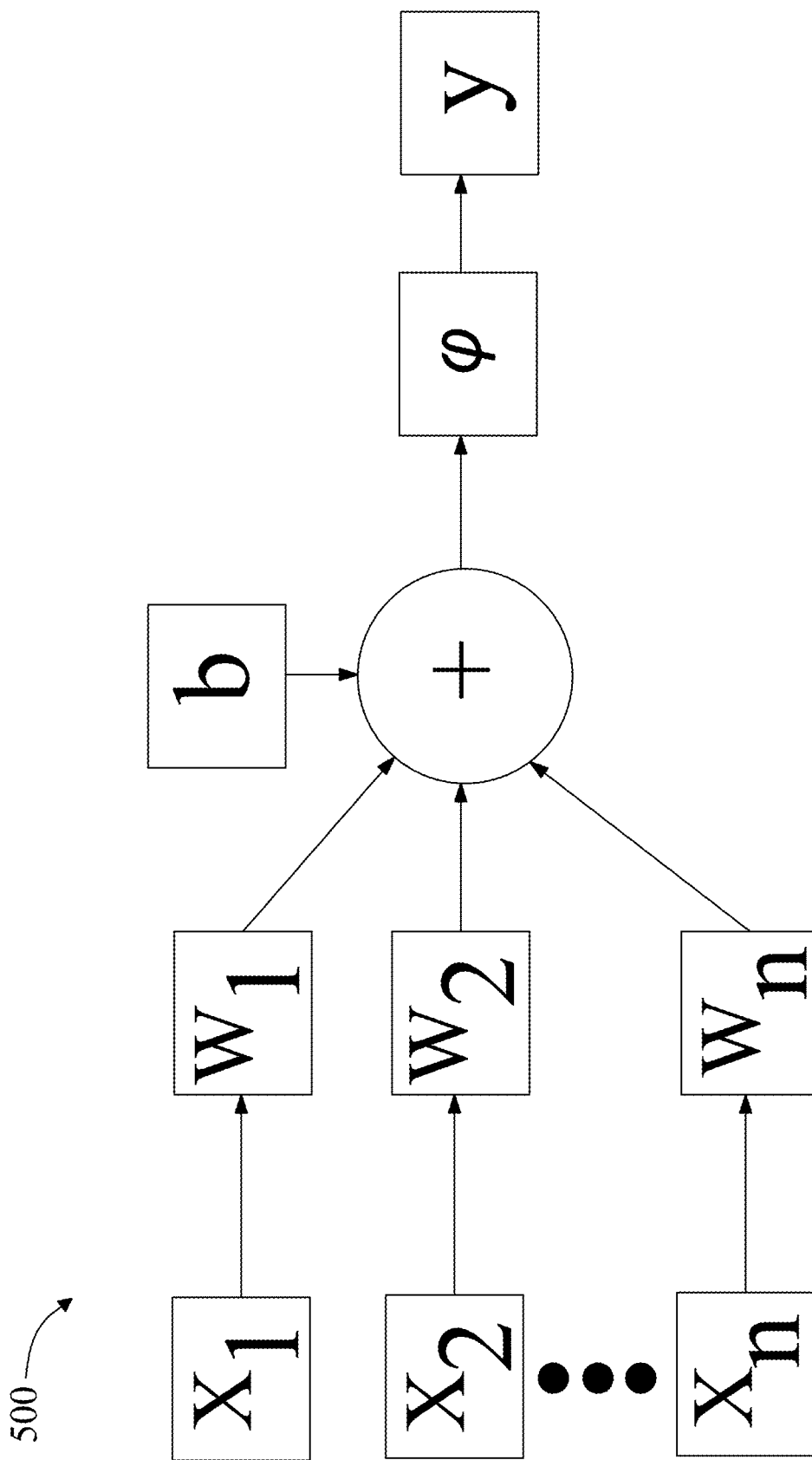
FIG. 5 is a diagram of an exemplary embodiment of a node of a neural network.

Referring now to FIG. 5, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
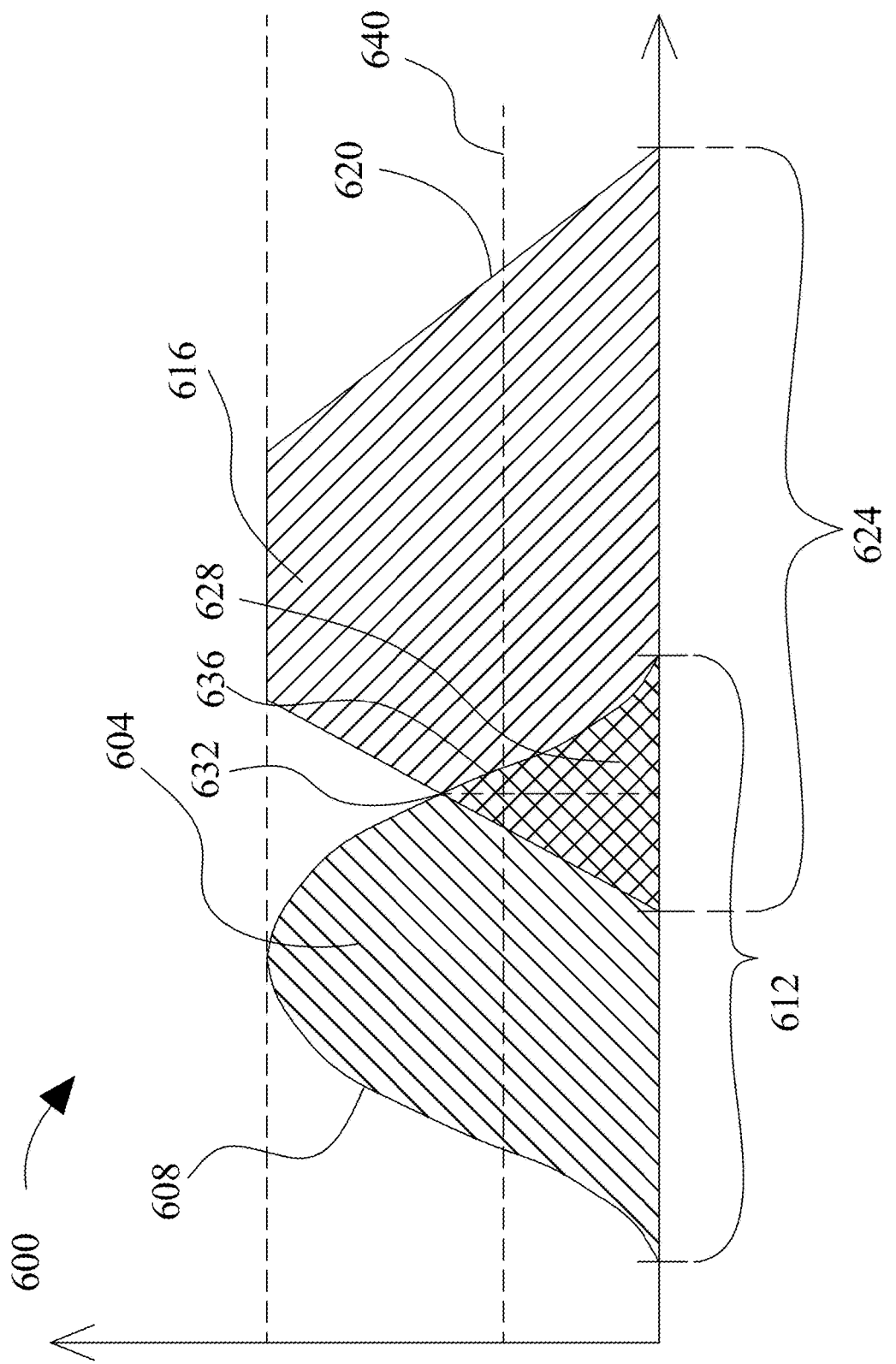
FIG. 6 is a graph illustrating an exemplary relationship between fuzzy sets.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent pattern datum 116, target 124, and modified target 128 from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input and/or output the pattern datum 116, modified target 128, and/or target 124. For instance, an acceptance variable may represent a first measurable value pertaining to the pattern datum 116, modified target 128, and target 124. Continuing the example, an output variable may represent a modified target 128 specific the current user. In an embodiment, pattern datum 116 and target 124 may be represented by their own fuzzy set. In other embodiments, a modified target 128 specific to the user may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any software component datum, any source repository datum, any malicious quantifier datum, any predictive threshold datum, any string distance datum, any resource datum, any niche datum, and/or any combination of the above. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, an modified target 128 may indicate a sufficient degree of overlap with the target 124 and patten datum 116 for combination to occur as described above. There may be multiple thresholds; for instance, a second threshold may indicate a sufficient match for purposes of past posting and posting query as described in this disclosure. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both targets 124 and pattern datum 116 have fuzzy sets, a target 124 may be matched to a pattern datum 116 by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Some embodiments described herein may include, generate, modify, use, and/or otherwise function and/or interact with an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered. Data elements are listing in immutable sequential listing; data elements may include any form of data, including textual data, image data, encrypted data, cryptographically hashed data, and the like. Data elements may include, without limitation, one or more at least a digitally signed assertions. In one embodiment, a digitally signed assertion is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion. In an embodiment, collection of textual data states that the owner of a certain transferable item represented in a digitally signed assertion register is transferring that item to the owner of an address. A digitally signed assertion may be signed by a digital signature created using the private key associated with the owner's public key, as described above.

A digitally signed assertion may describe a transfer of virtual currency, such as crypto-currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion may describe the transfer of a physical good; for instance, a digitally signed assertion may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

In one embodiment, an address is a textual datum identifying the recipient of virtual currency or another item of value in a digitally signed assertion. In some embodiments, address is linked to a public key, the corresponding private key of which is owned by the recipient of a digitally signed assertion. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion may record a subsequent a digitally signed assertion transferring some or all of the value transferred in the first a digitally signed assertion to a new address in the same manner. A digitally signed assertion may contain textual information that is not a transfer of some item of value in addition to, or as an alternative to, such a transfer. For instance, as described in further detail below, a digitally signed assertion may indicate a confidence level associated with a distributed storage node as described in further detail below.

In an embodiment, immutable sequential listing records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Immutable sequential listing may preserve the order in which the at least a posted content took place by listing them in chronological order; alternatively or additionally, immutable sequential listing may organize digitally signed assertions into sub-listings such as "blocks" in a blockchain, which may be themselves collected in a temporally sequential order; digitally signed assertions within a sub-listing may or may not be temporally sequential. The ledger may preserve the order in which at least a posted content took place by listing them in sub-listings and placing the sub-listings in chronological order. The immutable sequential listing may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, immutable sequential listing, once formed, may be inalterable by any party, no matter what access rights that party possesses. For instance, immutable sequential listing may include a hash chain, in which data is added during a successive hashing process to ensure non-repudiation. Immutable sequential listing may include a block chain. In one embodiment, a block chain is immutable sequential listing that records one or more new at least a posted content in a data item known as a sub-listing or "block." An example of a block chain is the BITCOIN block chain used to record BITCOIN transactions and values. Sub-listings may be created in a way that places the sub-listings in chronological order and link each sub-listing to a previous sub-listing in the chronological order so that any computing device may traverse the sub-listings in reverse chronological order to verify any at least a posted content listed in the block chain. Each new sub-listing may be required to contain a cryptographic hash describing the previous sub-listing. In some embodiments, the block chain contains a single first sub-listing sometimes known as a "genesis block."

The creation of a new sub-listing may be computationally expensive; for instance, the creation of a new sub-listing may be designed by a "proof of work" protocol accepted by all participants in forming the immutable sequential listing to take a powerful set of computing devices a certain period of time to produce. Where one sub-listing takes less time for a given set of computing devices to produce the sub-listing protocol may adjust the algorithm to produce the next sub-listing so that it will require more steps; where one sub-listing takes more time for a given set of computing devices to produce the sub-listing protocol may adjust the algorithm to produce the next sub-listing so that it will require fewer steps. As an example, protocol may require a new sub-listing to contain a cryptographic hash describing its contents; the cryptographic hash may be required to satisfy a mathematical condition, achieved by having the sub-listing contain a number, called a nonce, whose value is determined after the fact by the discovery of the hash that satisfies the mathematical condition. Continuing the example, the protocol may be able to adjust the mathematical condition so that the discovery of the hash describing a sub-listing and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing according to the protocol is known as "mining." The creation of a new sub-listing may be designed by a "proof of stake" protocol as will be apparent to those skilled in the art upon reviewing the entirety of this disclosure.

In some embodiments, protocol also creates an incentive to mine new sub-listings. The incentive may be financial; for instance, successfully mining a new sub-listing may result in the person or entity that mines the sub-listing receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings. Each sub-listing created in immutable sequential listing may contain a record or at least a posted content describing one or more addresses that receive an incentive, such as virtual currency, as the result of successfully mining the sub-listing.

Where two entities simultaneously create new sub-listings, immutable sequential listing may develop a fork; protocol may determine which of the two alternate branches in the fork is the valid new portion of the immutable sequential listing by evaluating, after a certain amount of time has passed, which branch is longer. "Length" may be measured according to the number of sub-listings in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing.

Additional data linked to at least a posted content may be incorporated in sub-listings in the immutable sequential listing; for instance, data may be incorporated in one or more fields recognized by block chain protocols that permit a person or computer forming a at least a posted content to insert additional data in the immutable sequential listing. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical cryptocurrency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

In some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings in a block chain computationally challenging; the incentive for producing sub-listings may include the grant of new crypto-currency to the miners. Quantities of crypto-currency may be exchanged using at least a posted content as described above.

Figure 7:
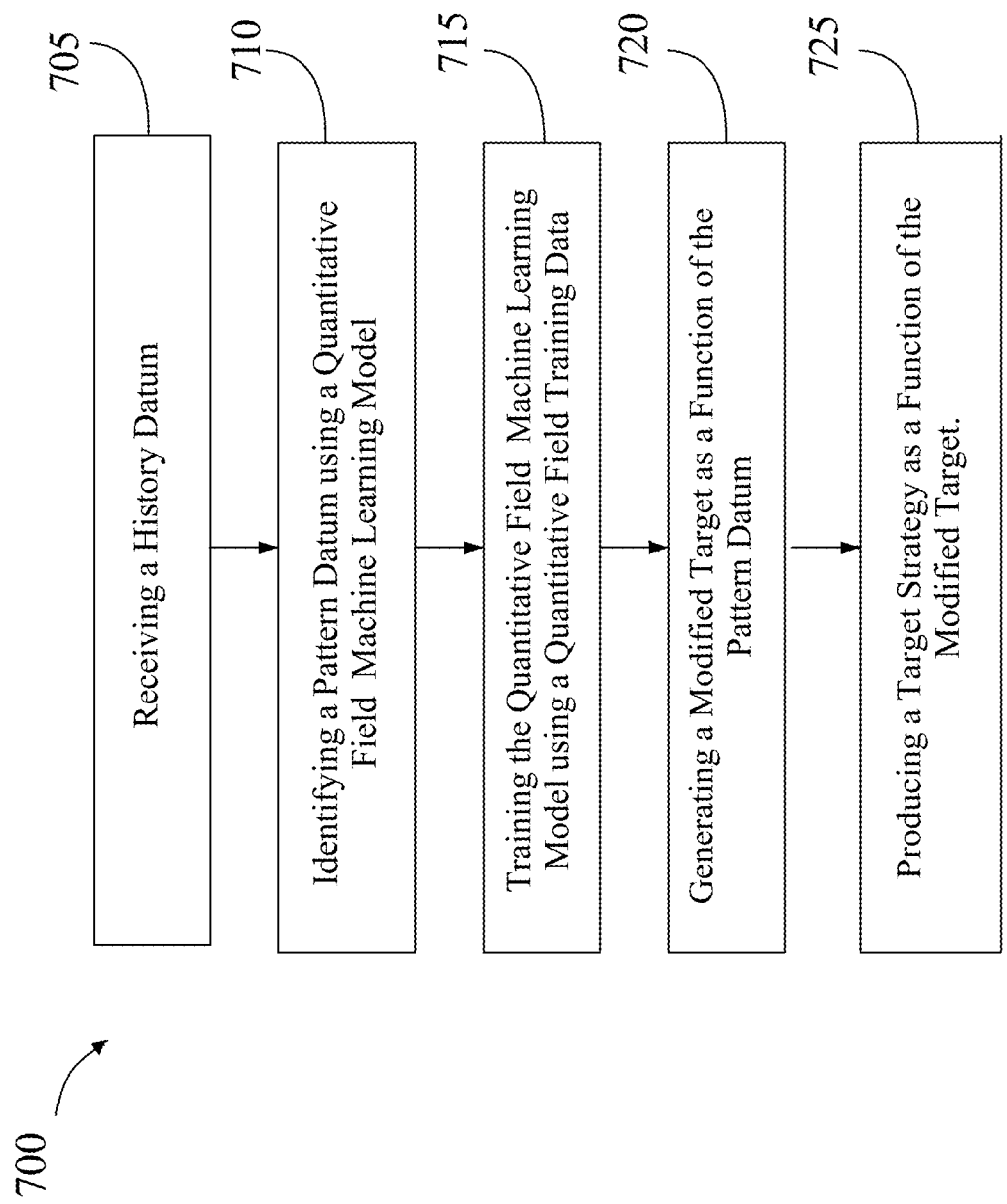
FIG. 7 is a flow diagram of an exemplary method for producing a target strategy.

Referring to FIG. 7, an exemplary method 700 of use for external activity verification. Method 700 includes a step 705, of receiving, using a processor, a history datum. This may occur as described above in reference to FIGS. 1-6. In an embodiment, a history datum may be generated using a survey datum.

With continued reference to FIG. 7, method 700 includes a step 710 of identifying, using a processor, a pattern datum using a quantitative field machine learning model. This may occur as described above in reference to FIGS. 1-6. In an embodiment, identification of a pattern data may comprise identification of a expenditure of resources. The pattern correction datum may be configured modify the pattern datum. A necessity rating may be generated as a function of the pattern datum. A modified target may also be generated as a function of the necessity rating.

With continued reference to FIG. 7, method 700 includes a step 715 of training, using a processor, the quantitative field machine learning model using a quantitative field training data, wherein the quantitative field training data contains a plurality of data entries containing a plurality of history data as inputs correlated to a plurality of pattern data as a output. This may occur as described above in reference to FIGS. 1-6.

With continued reference to FIG. 7, method 700 includes a step 720 of generating, using a processor, a modified target as a function of the pattern datum. This may occur as described above in reference to FIGS. 1-6. In an embodiment, the modified target may be generated using a target machine learning model. In another embodiment, a modified target may be generated using a fuzzy inference set. In another embodiment, a pattern correction datum may be generated as function of the modified target. The modified target may be generated as a function of a target With continued reference to FIG. 7, method 700 includes a step 725 of generating, using a processor, a target strategy as a function of the pattern datum. This may occur as described above in reference to FIGS. 1-6. In an embodiment, the target strategy is displayed on a graphical user interface. An element of decentralized fiat is awarded to the user as a function of the modified target. A target strategy may be generated as a function of the pattern correction datum. A target strategy may also be generated as a function of the pattern datum.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
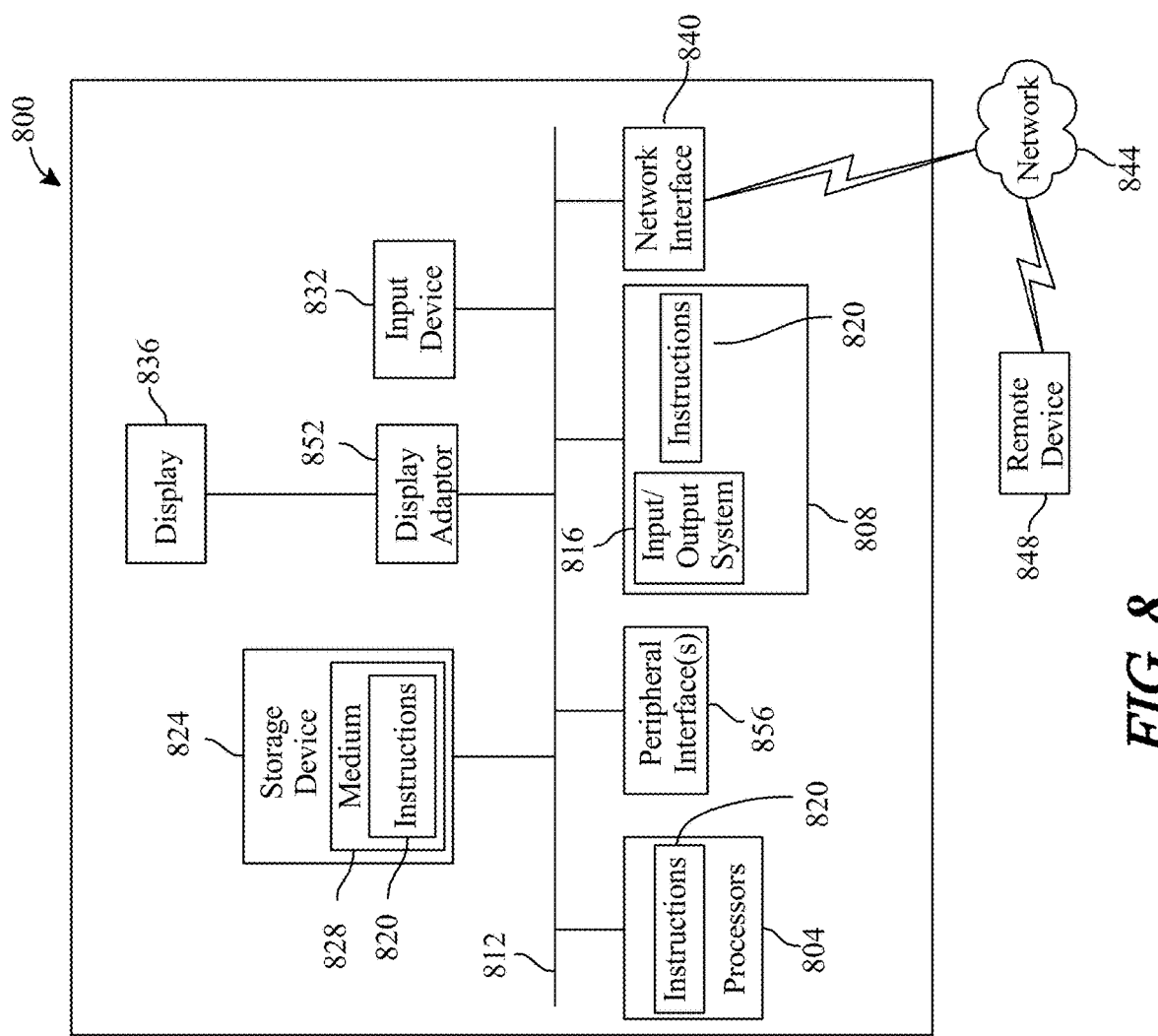
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for producing a target strategy, wherein the apparatus comprises:
   at least a processor; and
   a memory communicatively connected to the at least a processor, the memory containing instructions configuring the at least a processor to:
      receive a history datum and a target;
      identify a pattern datum as a function of a pattern quantitative field machine learning model, wherein identifying the pattern datum further comprises:
         training the quantitative field machine learning model as a function of a quantitative field training data, wherein the quantitative field training data contains a plurality of data entries containing a plurality of history data as inputs correlated to a plurality of pattern data as outputs, wherein quantitative field training data comprises at least a past pattern datum; and
         identifying the pattern datum as a function of the history datum using the quantitative field machine learning model;
      generate a necessity rating as a function of the pattern datum and the history datum wherein the necessity rating comprises a numerical score;
      generate a pattern correction datum as a function of the necessity rating, wherein the pattern correction datum is further configured to correlate the numerical score of the necessity rating to at least an efficiency datum;
      generate a modified target as a function of the pattern correction datum, wherein the modified target is generated using a target machine learning model wherein generating the modified target further comprises:
         receiving a training data set, wherein the training data set comprises outputs correlated with inputs, wherein the inputs comprise pattern data inputs and the outputs comprise modified target outputs; and
         generating the target machine learning model as a function of the training data set, wherein the trained target machine learning model determines a modified target as a function of the corrected pattern datum;
      produce a target strategy as a function of the modified target;
      generate a decentralized fiat as a function of the target strategy, wherein the decentralized fiat comprises at least a non-fungible token;
      issue a certificate of completion to a user after the user has achieved a waypoint in accomplishing the target strategy, wherein the decentralized fiat represents the certificate of completion.

2. The apparatus of claim 1, wherein the pattern correction datum includes instructions to improve efficiency of the user.

3. The apparatus of claim 1, wherein the target strategy is generated as a function of the pattern correction datum.

4. The apparatus of claim 1, wherein the target strategy is generated as a function of the pattern datum.

5. The apparatus of claim 1, wherein the history datum is generated using a survey datum.

6. The apparatus of claim 1, wherein the modified target is generated as a function of the necessity rating.

7. The apparatus of claim 1, wherein the modified target is generated as a function of the target.

8. The apparatus of claim 1, wherein an element of decentralized fiat is awarded to the user as a function of the modified target.

9. A method for producing a target strategy, wherein the method comprises:
   receiving, by a processor, a history datum and a target;
   identifying, by the processor, a pattern datum as a function of a pattern quantitative field machine learning model, wherein identifying the pattern datum further comprises:
      training the quantitative field machine learning model as a function of a quantitative field training data, wherein the quantitative field training data contains a plurality of data entries containing a plurality of history data as inputs correlated to a plurality of pattern data as outputs, wherein quantitative field training data comprises at least a past pattern datum; and
      identifying the pattern datum as a function of the history datum using the quantitative field machine learning model;
   generating, by the processor, a necessity rating as a function of the pattern datum and the history datum, wherein the necessity rating comprises a numerical score;
   generating, by the processor, a pattern correction datum as a function of the necessity rating wherein the pattern correction datum is further configured to correlate the numerical score of the necessity rating to at least an efficiency datum;
   generating, by the processor, a modified target as a function of the pattern correction datum, wherein the modified target is generated using a target machine learning model, wherein generating the modified target further comprises:
      receiving a training data set, wherein the training data set comprises outputs correlated with inputs, wherein the inputs comprise pattern data inputs and the outputs comprise modified target outputs; and
      generating the target machine learning model as a function of the training data set, wherein the trained target machine learning model determines a modified target as a function of the corrected pattern datum;
   producing, by the processor, a target strategy as a function of the modified target;
   generating a decentralized fiat as a function of the target strategy, wherein the decentralized fiat comprises at least a non-fungible token;
   issue a certificate of completion after user has achieved a waypoint in achieving the target strategy, wherein the decentralized fiat represents the certificate of completion.

10. The method of claim 9, wherein the pattern correction datum includes instructions to improve efficiency of the user.

11. The method of claim 9, wherein the target strategy is generated as a function of the pattern correction datum.

12. The method of claim 9, wherein the target strategy is generated as a function of the pattern datum.

13. The method of claim 9, wherein the history datum is generated using a survey datum.

14. The method of claim 9, wherein the modified target is generated as a function of the necessity rating.

15. The method of claim 9, wherein the modified target is generated as a function of the target.

16. The method of claim 9, wherein an element of decentralized fiat is awarded to the user as a function of the modified target.

* * * * *